US005746533A

United States Patent [19]

Schmidt

[11] Patent Number: 5,746,533

[45] **Date of Patent: *May 5, 1998**

[54] LOCKABLE HINGE MECHANISM

[76] Inventor: Todd W. Schmidt, 214 E. Collins Rd., Fort Wayne, Ind. 46825

[ * ] Notice: The term of this patent shall not extend beyond the expiration date of Pat. No. 5,539,957.

[21] Appl. No.: 679,525

[22] Filed: Jul. 12, 1996

Related U.S. Application Data

[63] Continuation-in-part of Ser. No. 328,116, Oct. 24, 1994, Pat. No. 5,539,957, and Ser. No. 380,682, Jan. 30, 1995, abandoned.

[51] Int. Cl.$^6$ .................................................. F16C 11/10

[52] U.S. Cl. .......................... 403/102; 403/353; 16/331; 16/319

[58] Field of Search .................................. 403/102, 353, 403/294, 325, 321, 331; 16/331, 319, 324, 254, 260, 270, 271; 5/99.1, 98.1; 43/12

[56] References Cited

U.S. PATENT DOCUMENTS 539,796 5/1895 Close .................................... 403/353
609,634 8/1898 Tanner ............................... 403/102 X
1,932,436 10/1933 Barnhill ................................. 403/353
2,441,689 5/1948 Daniel ................................ 403/102 X
2,744,794 5/1956 Sheard ............................... 403/102 X
5,539,957 7/1996 Schmidt .................................. 16/331

*Primary Examiner*—Anthony Knight
*Attorney, Agent, or Firm*—Roger M. Rickert

[57] ABSTRACT

A lockable hinge mechanism includes a hinge member and a pair of elongated tubular members with respective ends pivotably joined to the hinge member for movement of the tubular members between generally parallel and collinear relative positions. In one embodiment, a single hollow cylindrical cuff at least partially surrounds the hinge member and is coaxially rotatable relative to the tubular members through a range of about 180 degrees and precludes relative movement of the tubular members from the collinear position to the parallel position when in one location and allows relative movement of the tubular members from the collinear position to the parallel position in another location. The cuff cooperates with an abutment near said respective ends of the tubular members and has opposed semicylindrical extensions for engaging the abutments. The hinge member also has a pair of opposed semicylindrical end portion for engaging the abutments. When the semicylindrical ends and semicylindrical extensions are juxtaposed, the hinge is unlocked and when those semicylindrical parts are opposed, the hinge is locked.

9 Claims, 3 Drawing Sheets

LOCKABLE HINGE MECHANISM

CROSS-REFERENCE TO RELATED APPLICATIONS

This application is a continuation-in-part of my two applications Ser. No. 08/328.116 filed Oct. 24, 1994 (now U.S. Pat. No. 5,539,957 granted Jul. 30, 1996) and entitled COLLAPSIBLE GOAL HAVING AN ARTICULATED FRAME, and Ser. No. 08/380,682 filed Jan. 30, 1995 and entitled COLLAPSIBLE GOAL AND NET (now abandoned).

The present invention relates generally to a hinge mechanism for pivotably joining tubular sections and more particularly to such a hinge mechanism which may be locked in one position. The hinge mechanism is well suited to collapsible devices such as sports goals, lawn furniture, tent poles, frames for supporting trash bags, and other applications where a tubular framework may be partially disassembled, folded or otherwise collapsed to form a smaller or more compact package for shipping or storage. The present invention finds particular utility in collapsible goal assemblies such as disclosed in my two abovementioned copending applications.

In FIG. 6 of my copending application Ser. No. 08/328,116 a lockable hinge mechanism is shown. Briefly, this application teaches a pair of tubular members having respective ends pivotably joined as by pins for movement between generally orthogonal and collinear relative positions. The locking mechanism includes a cylindrical cuff which is selectively operable by rotation about its axis to one position to prevent relative movement of the tubular members from the collinear position to the orthogonal position and to another position where pivotal motion is allowed. The locking mechanism also includes an abutment on one of the tubular member. The cylindrical cuff surrounds the other tubular member and has a semicylindrical extension for engaging the abutment. The other tubular member also has a semicylindrical end portion for engaging the abutment. Relative angular movement of the tubular members is precluded when the semicylindrical end and the semicylindrical extension are misaligned.

As best seen in FIG. 10 of my copending Ser. No. 08/380,682, three elongated tubular members may have their respective ends pivotably joined for movement between a first configuration in which two of the elongated tubular members are collinear and the third is generally perpendicular to the first two, and a second configuration where all three members are parallel to one another. With two locking cuffs properly positioned in their unlocked condition, two of these tubular members may be pivoted to that second configuration. If the pivotal axes are not parallel, these two tubular members will be skewed in the second position. An assembly technique assuring parallelism of these axes would be very desirable.

In FIG. 12 of Ser. No. 08/380,682 two lockable hinge structures are employed to join two elongated tubular members. In this case, the two elongated members are each pivotably joined to a very short stub and each can pivot through 90 degrees relative to that stub. Thus, the members may be selectively pivoted from a collinear to a relatively parallel position, but two locking hinge structures are required. It would be highly desirable to achieve this result without the need for two separate locking hinge structures.

The entire disclosures of the abovementioned copending applications are specifically incorporated herein by reference.

Among the several objects of the present invention may be noted the provision of a locking hinge mechanism which achieves the above noted desirable features; the provision of a hinge structure having tighter or more solid pivotal connections than was heretofor possible; the provision of a more easily released rigid hinge structure; the provision of a more rigid collapsible goal assembly; and the provision of lockable 180 degree hinge utilizing a single rotatable locking cuff. These as well as other objects and advantageous features of the present invention will be in part apparent and in part pointed out hereinafter.

In general, a lockable hinge mechanism includes a central hinge member and a pair of elongated tubular members having respective ends pivotably joined to the hinge member for movement of the tubular members between generally parallel and collinear relative positions. A selectively operable locking cuff at least partially surrounds the hinge member and is coaxially rotatable relative to the tubular members through a range of about 180 degrees for precluding relative angular movement of the tubular members in one location and allowing relative angular movement of the tubular members when in another location. The hinge member is a hollow generally cylindrical member having diametrically opposed generally parallel inner side wall surface flats and hinge pin accepting apertures extending orthogonally to the flat surfaces. The tubular member respective ends are generally cylindrical and include diametrically opposed flattened parallel surface portions adapted to engage corresponding side wall surface flats.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
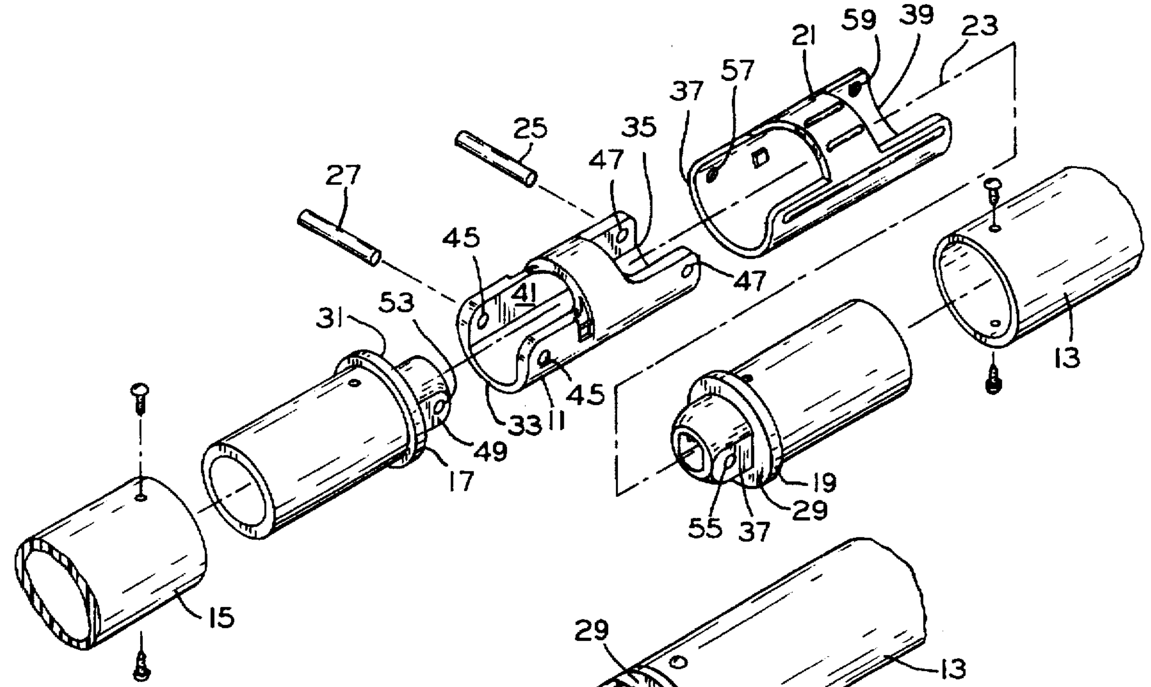
FIG. 1 is an exploded isometric view of a dual hinge pin, single locking cuff hinge assembly according to the invention in one form.
Figure 2:
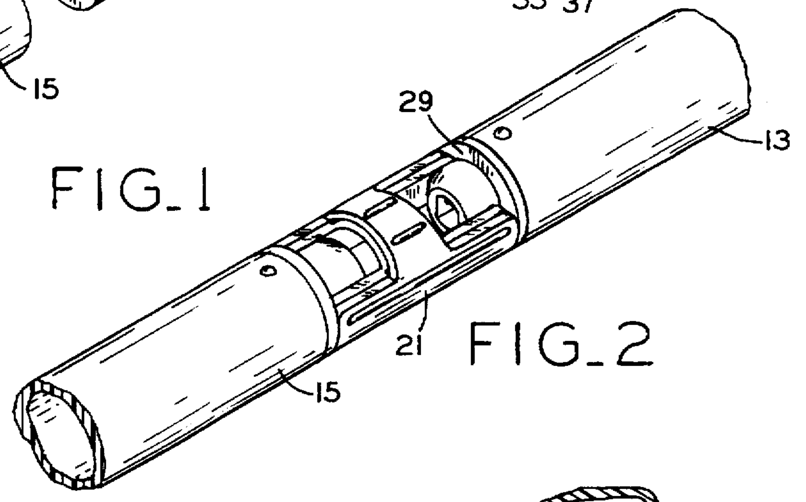
FIG. 2 is an isometric view of the hinge assembly of FIG. 1 in its extended and unlocked configuration.
Figure 3:
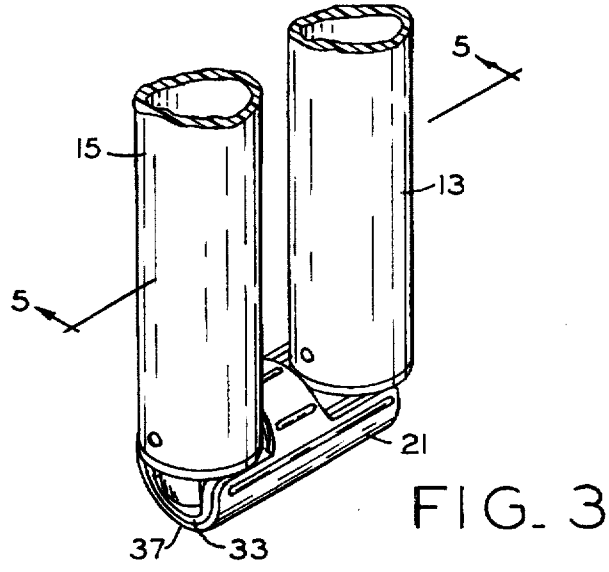
FIG. 3 is an isometric view of the hinge assembly of FIG. 1 in its collapsed or folded and unlocked configuration.
Figure 4:
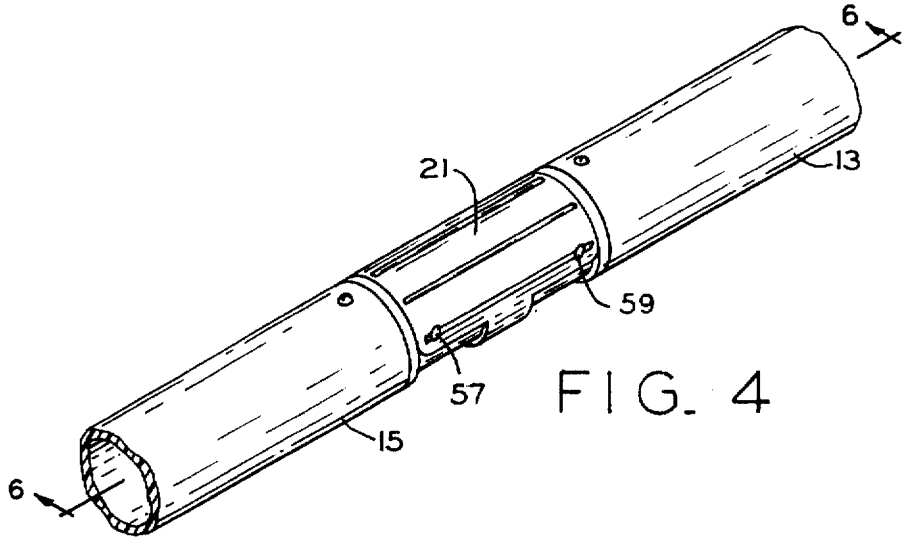
FIG. 4 is an isometric view of the hinge assembly of FIG. 1 in its extended and locked configuration.
Figure 5:
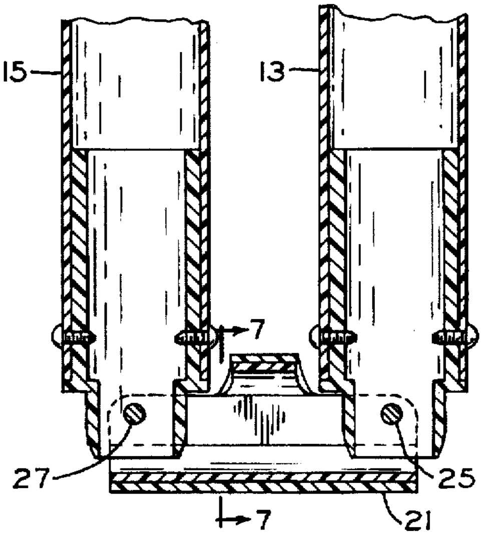
FIG. 5 is a view in cross-section along lines 5—5 of FIG. 3.
Figure 6:
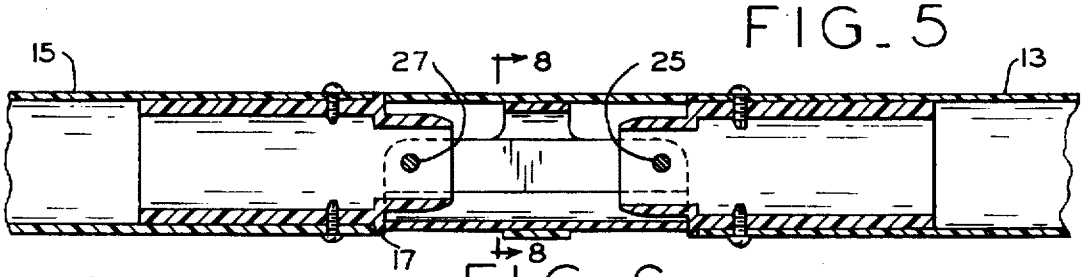
FIG. 6 is a view in cross-section along lines 6—6 of FIG. 4.

In FIG. 1, the lockable hinge mechanism is seen to include a hinge member 11 and a pair of elongated tubular members 13 and 15 having respective ends 17 and 19 pivotably joined to the hinge member 11 for movement of the tubular members 13 and 15 between a generally parallel configuration as shown in FIGS. 3 and 5, and a collinear relative position as shown in FIGS. 2, 4 and 6. Member 13 pivots about hinge pin 25 and may experience 90 degrees of pivotal motion relative to the hinge member 11. Similarly, member 15 pivots about hinge pin 27 and may experience an additional 90 degrees of pivotal motion relative to the hinge member 11. The mechanism further includes a hollow cylindrical cuff 21 which partially surrounds the hinge member 11 and is coaxially rotatable relative to the tubular members 13 and 15 as well as to the hinge member 11 through a range of about 180 degrees. With the cylindrical cuff 21 in the angular position shown in FIGS. 1–3, the tubular members 13 and 15 are free to move from the collinear position of FIG. 2 to the parallel position of FIG. 3 and, of course, back to the collinear position as desired. However, if the cuff 21 in FIG. 2 is rotated about the cylinder axis 23 to the location illustrated in FIG. 4, the cuff now precludes relative movement of the tubular members from the collinear position of FIG. 4 to the parallel position.

To understand why the cuff locks, circular abutments 29 and 31 are located near the ends of the tubular members. The cylindrical cuff 21 has opposed semicylindrical extensions 37 and 39 for engaging the abutments 29 and 31. The hinge member 11 also has a pair of opposed semicylindrical end portions 33 and 35 for similarly engaging the abutments. The tubular members 13 and 15 are relatively movable when the semicylindrical ends 33 and 35 and the corresponding semicylindrical extensions 37 and 39 are positioned adjacent the same semicircular portions of the abutments as in FIGS. 2 and 3, however, relative movement of the tubular members is precluded when the semicylindrical ends 33 and 35 and corresponding semicylindrical extensions 37 and 39 are misaligned.

Figure 7:
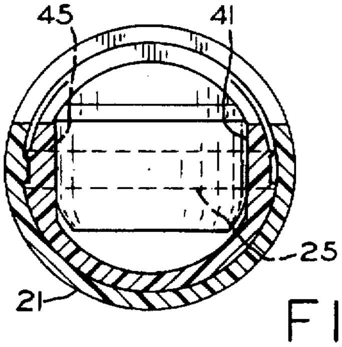
FIG. 7 is a view in cross-section along lines 7—7 of FIG. 5.
Figure 8:
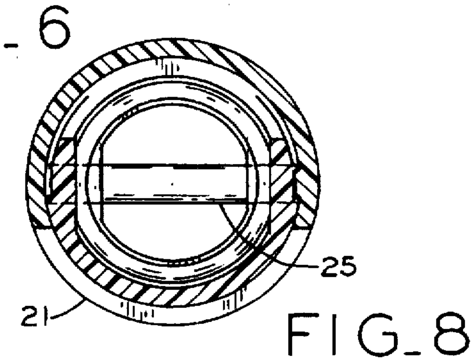
FIG. 8 is a view in cross-section along lines 8—8 of FIG. 6.

Hinge member 11 is a generally cylindrical member which may be hollow, but deviates from a true cylindrical inner surface by having diametrically opposed generally parallel inner side wall surface flats 41 and 43 (FIG. 7). The hinge member 11 has hinge pin accepting apertures 45 and 47 which extend orthogonally to the flat surfaces 41 and 43. The respective ends of the tubular members are generally cylindrical and include diametrically opposed flattened parallel surface portions such as 49 and 51 which engage their corresponding side wall surface flats such as 41 and 43 and align the respective tubular member ends within the hinge member. These flats provide a more solid hinge structure.

The tubular member respective ends also include hinge pin accepting apertures 53 and 55 which are alignable with corresponding hinge member hinge pin accepting apertures 45 and 47. The cylindrical cuff 21 includes hinge pin access apertures 57 and 59 alignable with the hinge member and tubular member hinge pin accepting apertures for assembly purposes.

Figure 9:
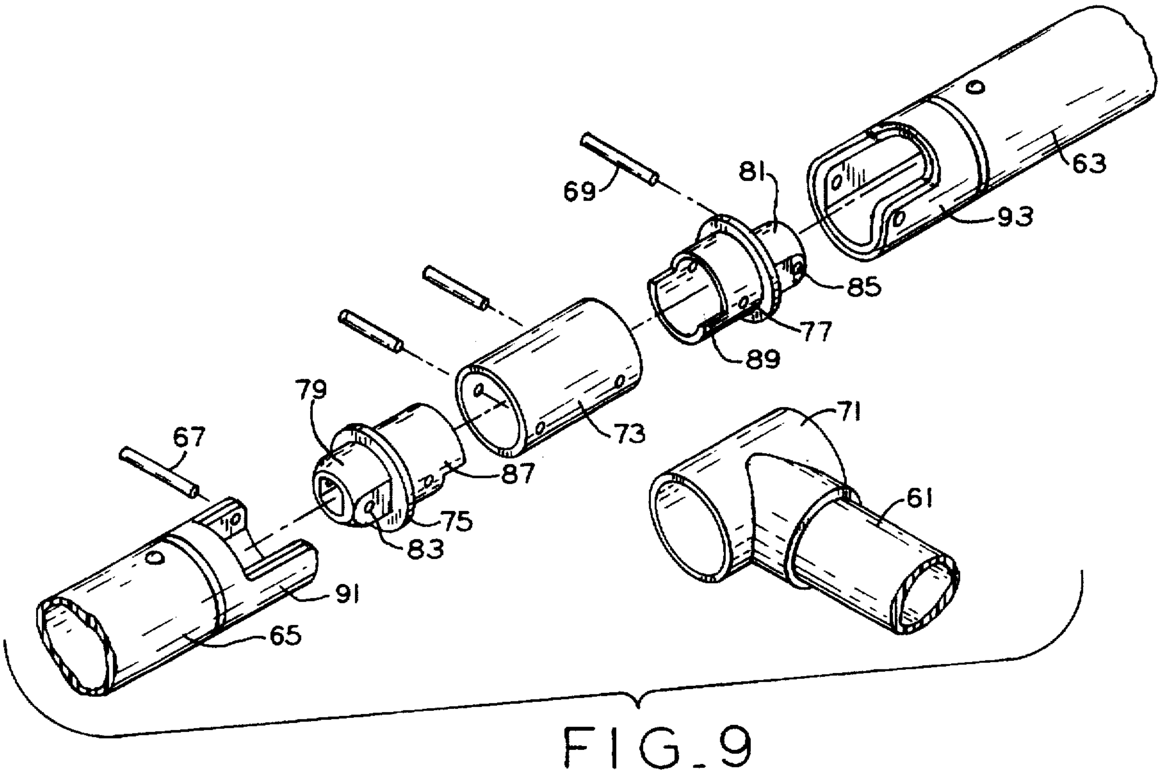
FIG. 9 is an exploded isometric view of a dual hinge pin, dual locking cuff hinge assembly according to the present invention.

In FIG. 9, the lockable hinge mechanism includes three elongated tubular members 61, 63 and 65 which have their respective ends pivotably joined by the T 71 surrounding sleeve 73, and hinge pins 67 and 69 so that the members may be moved between a first configuration in which two of the elongated tubular members 63 and 65 are collinear and the third 61 is generally perpendicular to the first two, and a second or folded configuration in which the three elongated tubular members are generally parallel to one another. The third elongated tubular 61 member has the hollow T permanently affixed to one end thereof and is free to rotate about the sleeve 73. The hinge member which pivotably interconnects respective ends of said two elongated tubular members 63 and 65 includes the hollow generally cylindrical tubular portion or sleeve 73 which is disposed within the T and has opposite ends receiving a further pair of cylindrical members 75 and 77. These further cylindrical members have exposed respective ends 79 and 81 each of which is generally cylindrical and includes a transverse hinge pin accepting aperture 83 or 85. The cylindrical member ends opposite the exposed ends include matable semicylindrical sections 87 and 89 which, when juxtaposed, align the axes of the transverse hinge pin accepting apertures 83 and 85 in a common plane thereby assuring parallelism of the tubular members 63 and 65 when folded in the second configuration. A pair of hollow cylindrical cuffs 91 and 93 function as previously described to allow pivotal movement when in the position illustrated, but lock the hinges when rotated through about 180 degrees to precluding relative movement of the tubular members from the collinear position illustrated, to the parallel position.

In one preferred form, the lockable hinge structure is formed of NYLON, PVC or similar plastic material. The tubular members 13 and 15 as well as other components may be joined by suitable solvent/adhesive materials or by screws such as 95. The lockable hinge may also be made of metal materials, for example, by casting. In some cases, it is desirable to provide the abutments 29 and 31 with low friction coatings, bushings or bearings.

In summary, the invention has a number of advantages over known prior devices paramount of which are ease of operation and improved rigidity.

From the foregoing, it is now apparent that a novel lockable hinge structure has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. A lockable hinge mechanism comprising a hinge member and a pair of elongated tubular members having respective ends pivotably joined to the hinge member for movement of the tubular members between generally parallel and collinear relative positions, and selectively operable means comprising a hollow cylindrical cuff at least partially surrounding the hinge member and coaxially rotatable relative to the tubular members through a range of about 180 degrees for precluding relative movement of the tubular members from the collinear position to the parallel position when in one location and allowing relative movement of the tubular members from the collinear position to the parallel position when in another location, said selectively operable means including abutments near said respective ends of the tubular members, said cylindrical cuff having opposed semicylindrical extensions for engaging the abutments and the hinge member having a pair of opposed semicylindrical end portions for engaging the abutments.

2. The lockable hinge mechanism of claim 1 wherein the abutments are generally circular, relative movement of the tubular members being precluded when the semicylindrical ends and corresponding semicylindrical extensions are misaligned, while the tubular members are relatively movable when the semicylindrical ends and the corresponding semicylindrical extensions are positioned adjacent the same semicircular portions of the abutments.

3. The lockable hinge mechanism of claim 1 wherein the hinge member is a generally cylindrical member having diametrically opposed generally parallel inner side wall surface flats and having hinge pin accepting apertures extending orthogonally to the flat surfaces.

4. The lockable hinge mechanism of claim 3 wherein the tubular member respective ends are generally cylindrical and include diametrically opposed flattened parallel surface portions adapted to engage corresponding side wall surface flats and align the respective tubular member ends within the hinge member.

5. The lockable hinge mechanism of claim 4 wherein the tubular member respective ends include hinge pin accepting apertures alignable with corresponding hinge member hinge pin accepting apertures and the cylindrical cuff includes hinge pin access apertures alignable with the hinge member and tubular member hinge pin accepting apertures when the cylindrical cuff is in said another location.

6. A lockable hinge mechanism comprising a hinge member and a pair of elongated tubular members having respective ends pivotably joined to the hinge member for movement of the tubular members between generally parallel and collinear relative positions, selectively operable means comprising a pair of hollow cylindrical cuffs each having opposed semicylindrical extensions and each at least partially surrounding a corresponding tubular member end and coaxially rotatable relative to the tubular members through a range of about 180 degrees for precluding relative movement of the tubular members from the collinear position to the parallel position when in one location and allowing relative movement of the tubular members from the collinear position to the parallel position when in another location, the hinge member comprising a hollow generally cylindrical tubular portion having opposite ends receiving a further pair of cylindrical members, each of said further pair being pivotably joined to a corresponding one of said elongated tubular members, the further pair of cylindrical members having exposed respective ends which are generally cylindrical and include diametrically opposed flattened parallel surface portions adapted to engage and align the respective tubular member ends with the hinge member.

7. The lockable hinge mechanism of claim 6 wherein the cylindrical member ends opposite the exposed ends include matable semicylindrical sections which, when juxtaposed, determine the angular orientation between the cylindrical members.

8. A lockable hinge mechanism comprising a hinge member and a pair of elongated tubular members having respective ends pivotably joined to the hinge member for movement of the tubular members between generally parallel and collinear relative positions, selectively operable means comprising a pair of hollow cylindrical cuffs, each at least partially surrounding a corresponding tubular member end and coaxially rotatable relative to the tubular members through a range of about 180 degrees for precluding relative movement of the tubular members from the collinear position to the parallel position when in one location and allowing relative movement of the tubular members from the collinear position to the parallel position when in another location, the hinge member comprising a hollow generally cylindrical tubular portion having opposite ends receiving a further pair of cylindrical members, the further pair of cylindrical members having exposed respective ends each of which is generally cylindrical and includes a transverse hinge pin accepting aperture, the cylindrical member ends opposite the exposed ends including matable semicylindrical sections which, when juxtaposed, align the axes of the transverse hinge pin accepting apertures in a common plane.

9. A lockable hinge mechanism comprising three elongated tubular members having respective ends pivotably joined for movement between a first configuration in which two of the elongated tubular members are collinear and the third is generally perpendicular to the first two and a second configuration in which the three elongated tubular members are generally parallel to one another, the third elongated tubular member having a hollow T at one end thereof, a hinge member pivotably interconnecting respective ends of said two elongated tubular members comprising a hollow generally cylindrical tubular portion disposed within the T and having opposite ends receiving a further pair of cylindrical members, the further pair of cylindrical members having exposed respective ends each of which is generally cylindrical and includes a transverse hinge pin accepting aperture, the cylindrical member ends opposite the exposed ends including matable semicylindrical sections which, when juxtaposed, align the axes of the transverse hinge pin accepting aperture in a common plane thereby assuring parallelism of the tubular members when in the second configuration, and selectively operable means associated with said two of the elongated tubular members for precluding relative movement of the two elongated tubular members from the first configuration to the second configuration comprising a pair of hollow cylindrical cuffs, each at least partially surrounding a corresponding tubular member end and coaxially rotatable relative to the tubular members through a range of about 180 degrees for precluding relative movement of the tubular members from the collinear position to the parallel position when in one location and allowing relative movement of the tubular members from the collinear position to the parallel position when in another location.

* * * * *